Sept. 5, 1967 A. W. WETMORE 3,340,403

MAGNETIC CORE ENCODING CIRCUIT

Filed May 9, 1963

4 Sheets-Sheet 1

Sept. 5, 1967 A. W. WETMORE 3,340,403

MAGNETIC CORE ENCODING CIRCUIT

Filed May 9, 1963 4 Sheets-Sheet 2

INVENTOR.
A.W. WETMORE

BY Forest G. Whitehead

INVENTOR.
A.W.WETMORE
BY Forest B. Hitchcock
HIS ATTORNEY

INVENTOR.
A.W. WETMORE
BY Forest B. Hitchcock
HIS ATTORNEY

United States Patent Office 3,340,403

Patented Sept. 5, 1967

3,340,403
MAGNETIC CORE ENCODING CIRCUIT

Arthur W. Wetmore, West Henrietta, N.Y., assignor to General Signal Corporation, Rochester, N.Y., a corporation of New York Filed May 9, 1963, Ser. No. 279,111
4 Claims. (Cl. 307—88)

ABSTRACT OF THE DISCLOSURE

This invention relates to the setting up of different binary codes in response to the designation of any particular one of a large number of input voltages, which input voltages are respectively connected to the multiaperture cores in a way to set up a binary code. The manner that the present invention provides for threading the conductors carrying the designated voltage is such as to reduce the number of conductors passing through any one core to a feasible number and yet providing that any selected one of a large number of output codes may be established. This involves the dividing of the cores into two groups and connecting each group in a manner to provide binary codes but with a coupling connection between the inputs to the two groups so that the initial set-up can select any one of a large number of codes to be established upon energization of a particular conductor.

*Background of the invention*

This invention relates to a circuit for wiring binary codes into apertured magnetic cores, and more particularly to an encoding circuit for obtaining a large number of output codes when only a smaller number of input voltages are available.

In automatic switching systems utilizing apertured magnetic cores, such as those used for controlling railway car classification yards, it is necessary to provide means for wiring into the system a code which is indicative of the route to be traveled through the yard by a cut of cars. This involves switching the magnetic flux of certain cores in a group so as to set those cores, while leaving other cores in the group in an unmagnetized, or clear condition. To expedite classification yard operations, it is important that each voltage applied to a single conductor establish a code in the group of cores.

In classification yards, it is desirable to have codes with a sufficient number of elements so that there is a separate element for each of the track switches in any series comprising a complete route. Many yards have as many as eight or nine different series of switches through which the cars must pass. These elements of the codes for the different switches have to be transferred from one switch to the next switch and when used cancelled off, all as shown in the prior patent of Frielinghaus Patent No. 3,307,081. This means that each of the sets of magnetic cores representing the code for a switch must be able to have its code transferred to the next succeeding switch. In providing these codes, it is understood that in no yard are all of the codes employed, but the desirable codes may vary in any particular yard, so that the possibility of using a large number of codes is highly desirable. But to provide connections or coupling between the input wires and the multi-aperture cores involved becomes a major problem.

Studies of existing car classification yards indicate that eight code bits are required for most single hump yards and nine code bits are required for most dual hump yards. With a nine bit code there is a possibility of providing 512 different codes. Although there is a practical limit to the possible number of codes which might be required in one yard, based upon the area which the yard may occupy, it is not possible to predict which of the 512 different codes will be needed. If each code were to be wired in separately, 512 inputs would be necessary and 256 wires would have to be passed through at least one of the apertured magnetic cores. In a multiaperture core, these wires would be passed through the major aperture. However, the relative sizes of wire and major apertures of multiaperture cores make such wiring scheme impractical if not impossible. To overcome this disadvantage and thereby provide means for selecting any of 512 different output codes by energizing predetermined ones of 160 input conductors, the novel wiring method and apparatus of the instant invention has been devised.

*Summary of the invention*

The invention generally contemplates a plurality of multiaperture magnetic cores, means selectively providing a plurality of input voltages, first conducting means coupling each input voltage to a first group of the plurality in accordance with a predetermined code, second conducting means, and switching means coupling each input voltage from the first conducting means to the second conducting means. The second conducting means couples each input voltage to a second group of the plurality in accordance with the predetermined codes.

By dividing the cores into two groups and providing a coupler between the two groups so that the inputs for the first group can be selectively connected to any one of the possible inputs to the second group which second group provides a much larger number of codes than is required for the input from the first group, it is possible then to initially select any of the desired codes to be established upon the energization of the appropriate input. This coupling means together with the character of the second group of cores is highly essential to the present invention. Specifically, in a classification yard having, for example, 160 different destination tracks, there are 160 different conductors, each of which must establish a particular code in the group of cores to which the conductors are coupled, when a voltage is applied thereto. Thus, it is obvious that one core in the group must have passing therethrough at least 80 different wires, since each of the 80 wires has the capability of switching or not switching the core, depending upon whether or not the wire is energized.

Accordingly, one object of this invention is to provide means for producing one of a large number of binary codes by energizing one of a lesser number of conductors.

Another object is to provide means by which a large number of output codes may be produced from a group of multiaperture magnetic cores having substantially smaller numbers of conductors coupled through the major apertures of each core.

Another object is to provide a method of actuating predetermined numbers of magnetic switching devices whereby a large number of binary output codes may be produced with economical use of wiring.

Another object is to provide a practical means for introducing binary codes into an automatic switching system utilizing multiaperture magnetic cores, whereby a large number of binary codes may be selected without requiring an excessive number of wires to be coupled through the major apertures of any of the cores.

The foregoing and other objects and advantages of the invention will become apparent from the following detailed description when read in conjunction with the accompanying drawings, in which.

Figure 1:
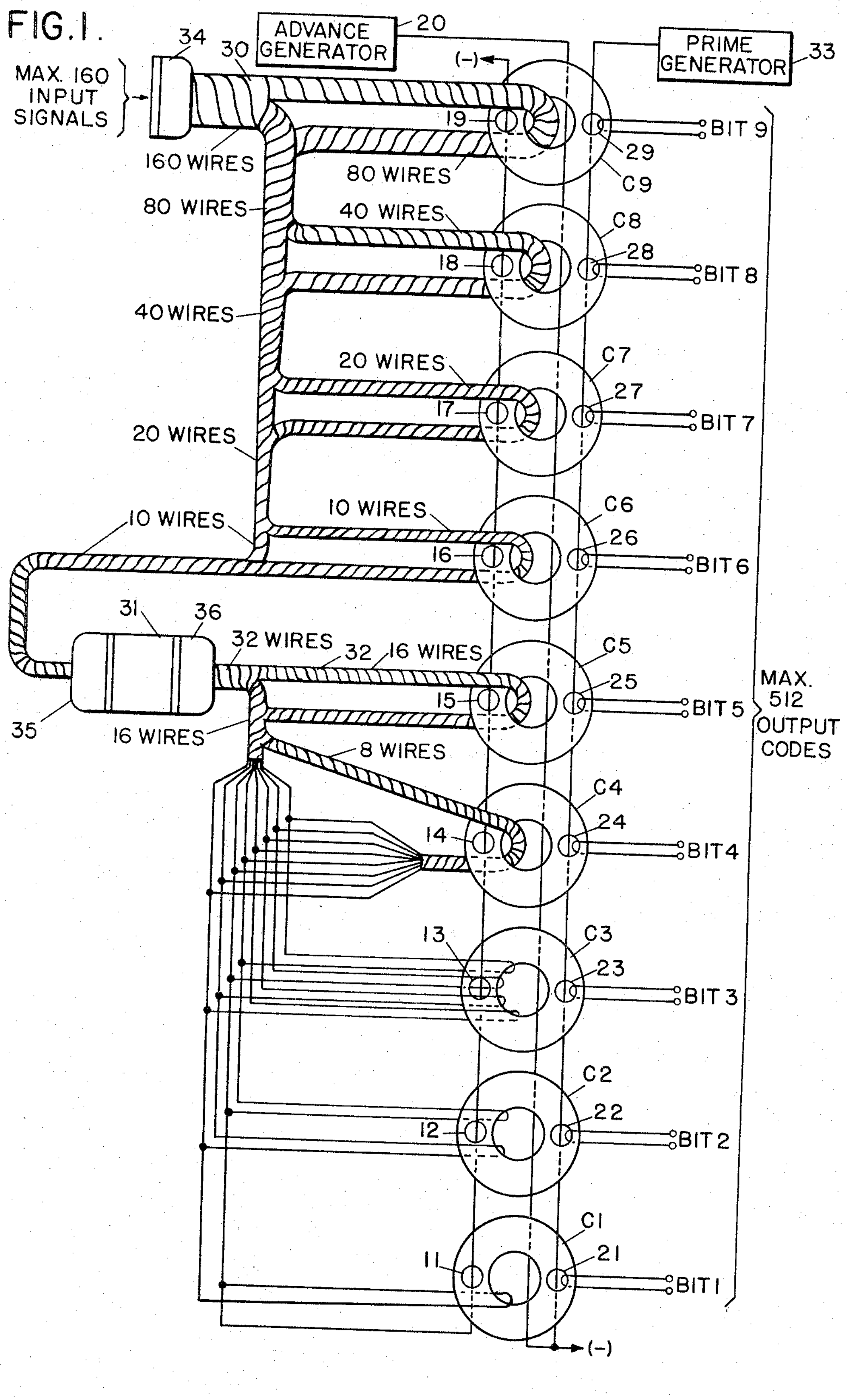
FIG. 1 is a part block and part schematic diagram of the instant invention.

Turning now to FIG. 1, there is shown a group of multiaperture magnetic cores C1–C9. Each core has a single input minor aperture 11–19, respectively, and a single output minor aperture 21–29, respectively.

An advance generator 20 provides an output which is coupled through the major apertures of cores C1–C9. This generator provides pulses for clearing the cores and producing output voltages from the output minor apertures of those cores which are set when the clear pulse is coupled therethrough. As will be obvious to those skilled in the art, the advance generator may be any voltage source in an automatic switching system which is responsive to the magnetic state of a group of cores in the system subsequent to and receiving an input from cores C1–C9. Thus, when the subsequent cores are in a clear condition and ready to accept the code comprising bits 1–9 stored in cores C1–C9, the advance generator produces an output pulse.

A prime generator 33 is provided for supplying prime current through output minor apertures 21–29. This generator may be either a steady state source of direct current, or a pulse generator responsive to circuit conditions in the system.

A maximum of 160 input wires are coupled from a destination selector, or other code selection means enabling separate energization of selected individual input wires, to a cable 30 comprising at its input 160 terminals. Each terminal accepts a voltage from one of the 160 input wires and couples the voltage to one of 160 wires making up the input side of cable 30. The terminals may be mounted on a suitable plug 34 for ease of connection.

Of the 160 wires in cable 30 originally coupled to plug 34, only half of that number are passed through the major aperture of core C9 in a direction to provide inner leg setting of the core. The other 80 wires are bypassed around the major aperture of core C9.

Figure 3:
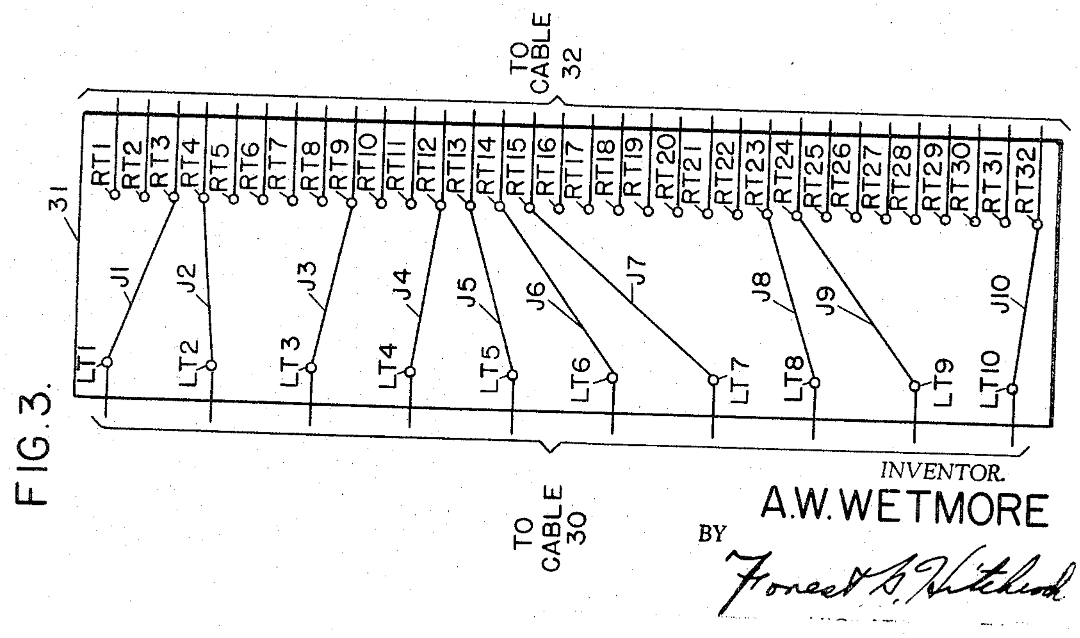
FIG. 3 is a schematic diagram of a plug coupler utilized in the circuit of FIG. 1.

Each of the 80 wires coupled through the major aperture of core C9 is coupled to a separate wire of the group of wires bypassing core C9. Thus, only 80 wires are then provided within the length of cable 30 between cores C8 and C9. At core C8, the wires in the cable are split so that 40 wires are passed through the major aperture of core C8 and the other 40 wires bypass core C8. Each of the wires passed through the major aperture of core C8 is then individually coupled to a separate wire in the group of wires bypassing core C8, so that only 40 wires are then provided within the length of cable 30 between cores C7 and C8. In similar fashion, at core C7 the wires in this portion of the cable are split so that 20 wires are threaded through the major aperture of core C7 and 20 in this portion of the cable are split so that 20 wires are then provided within the length of cable 30 between cores C6 and C7. At core C6, the wires in the cable are split so that 10 wires are threaded through the major aperture of core C6 and the other 10 wires bypass core C6. Thus, 10 wires are coupled to one side of a plug coupler 31 through suitable connecting means such as a plug 35. A typical circuit diagram of plug coupler 31 is illustrated in FIG. 3, described infra.

The right hand side of plug coupler 31 comprises 32 terminals. Through suitable connecting means such as a plug 35, a single wire is connected to each terminal, thereby providing 32 wires to be coupled to cores C5–C1. The wires are bound into a cable 32.

In a fashion similar to that already described, 16 of the wires in cable 32 are threaded through the major aperture of core C5 in a direction to set the core, while the other 16 wires bypass the core. Each of the 16 wires threaded through the major aperture is then coupled to a separate wire in the group of wires bypassing the core in a fashion similar to that described for cores C6–C9, so that only 16 wires are then provided within the length of cable 32 between cores C5 and C4. At core C4 the 16 wires are split so that 8 of the 16 wires thread the major aperture of core C4 while the other 8 wires bypass core C4. Each of the wires threading the major aperture of core C4 is then coupled to a separate wire in the group of wires bypassing core C4, so that only 8 wires are provided within the length of cable 32 between cores C3 and C4. This can be seen in FIG. 1 where the outer covering of the cable has been removed, for illustrative purposes. At core C3, 4 wires thread the major aperture and 4 wires bypass the core. Similarly, between cores C3 and C4, 4 wires are provided, enabling 2 wires to thread the major aperture of core C2 and 2 wires to bypass the core. Finally, from core C2, a single wire threads the major aperture of core C1, while another wire which bypasses the core is returned through minor aperture 11 of core C1 so as to produce inner leg setting of the core.

The wire possing through minor aperture 11 of core C1 is coupled through minor apertures 12–19 of cores C2–C9, respectively, to the negative terminal of a direct current supply. The purpose of this wire, as is well-known in the art, is to prevent oversetting of any of cores C1–C9 by restricting flux changes in cores C1–C9, caused by current flow through cables 30 and 32, to the inner legs of the cores only.

In operation, application of a positive voltage to any one of the 160 wires of cable 30 through plug 34 serves to simultaneously set preselected cores of the group C1–C9 in accordance with a predetermined pattern. The code is thereby stored within a stage from whence it may be transferred to a subsequent stage from output minor apertures 21–29 of cores C1–C9, respectively. At this point, a positive pulse may be generated by an advance generator 20, which couples clear pulses through the major apertures of each of cores C1–C9. This clears the cores, producing output pulses from the output minor apertures of the preselected set cores. This is known as destructive readout, since in addition to causing transfer of the information stored in cores C1–C9, the cores are also cleared. After the cores are cleared, the circuit is ready to receive a new input signal.

Since the circuit is shown as comprising 9 cores, there are 9 binary bits in each binary word produced by the cores. It should here be noted that the circuit is not limited to 9 cores, but may comprise any number of cores and still utilize the same principle.

Nine binary bits in a binary word can be combined in 29 or 512 different ways to form the word. Thus, there exists the capability of providing 512 different output codes from this circuit when nine cores are utilized. The manner in which 512 different output codes may be obtained is described infra.

Figure 2B:
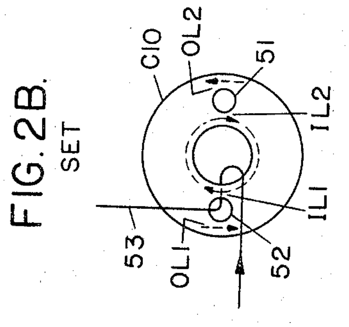
FIGS. 2A and 2B are schematic illustrations of magnetic flux paths induced in an apertured magnetic core as the result of currents passed therethrough.
Figure 2A:
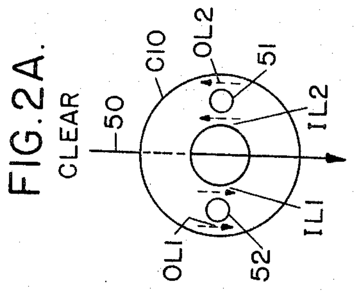

FIGS. 2A and 2B show, in elementary fashion, the method by which inner leg setting of a multiaperture core is achieved. Thus, FIG. 2A illustrates flux paths in a multiaperture core C10, having directions indicated by dotted arrows, after a clear pulse has been passed through the major aperture over a conductor 50 with current flow in a direction indicated by the arrow on the conductor. The direction of flux around output minor aperture 51 is shown in an overall counterclockwise direction in the core; in other words, there is no net flux established around the perimeter of minor aperture 51. The flux direction in inner leg IL1 is downward, while the flux direction in inner leg IL2 is upward. Similarly, the flux direction in outer leg OL1 is downward, while the flux direction in outer leg OL2 is upward.

Turning next to FIG. 2B, there is shown core C10 with energization applied to a conductor 53 threading the major aperture and input minor aperture 52 of the core. With current flow through conductor 53 in a direction indicated by the arrow on the conductor, whereby current flow encircles inner leg IL1, a magnetic flux direction is established in the core material around the perimeter of the major aperture in a clockwise direction, as illustrated by the arrows in the dotted circle around the major aperture. Since this current is applied to a clear core, it is apparent that a counterclockwise flux has now been established around the perimeter of output minor aperture 51, since the flux directions in the outer legs remain unchanged while the flux directions in the inner legs are reversed. The core is now in condition to receive a priming current through output minor aperture 51 for the purpose of reversing flux direction in inner leg IL2 and outer leg OL2. This effectively reverses flux direction around the perimeter of the output minor aperture, preparatory to producing an output pulse upon subsequent clearing of the core. This manner of producing an output pulse is well known in the art.

Turning next to FIG. 3, there is shown a schematic diagram of plug coupler 31. Two vertical rows of terminals, LT1–LT10 on the left and RT1–RT32 on the right, are provided. Jumpers J1–J10 are connected respectively between corresponding numbered terminals LT1–LT10 on the left side of coupler 31, and preselected terminals on the right side of the coupler. For example, jumper wire J1 may interconnect terminals LT1 and RT3, jumper wire J2 may interconnect terminals LT2 and RT4, and so on. Since each of the 32 wires at the input end of cable 32 of FIG. 1 is connected to a separate terminal in the group RT1–RT32, any single wire at the output end of cable 30 connected to terminals LT1–LT10 may be used to establish any code in the group of cores C1–C5. Thus, plug coupler 31 adds versatility to the circuit of FIG. 1 by enabling selection of any 160 output codes out of a maximum of 512 different output codes. Moreover, it should be noted that plug coupler 31 is not limited as to form since it may comprise, for example, a terminal board for directly coupling the wires of cable 30 to those of cable 32. On the other hand, as already pointed out, the plug coupler may comprise a coded plug for connection with complementary plugs at the ends of cables 30 and 32. Such plugs and plug coupler are illustrated in FIG. 1.

Figure 4A:
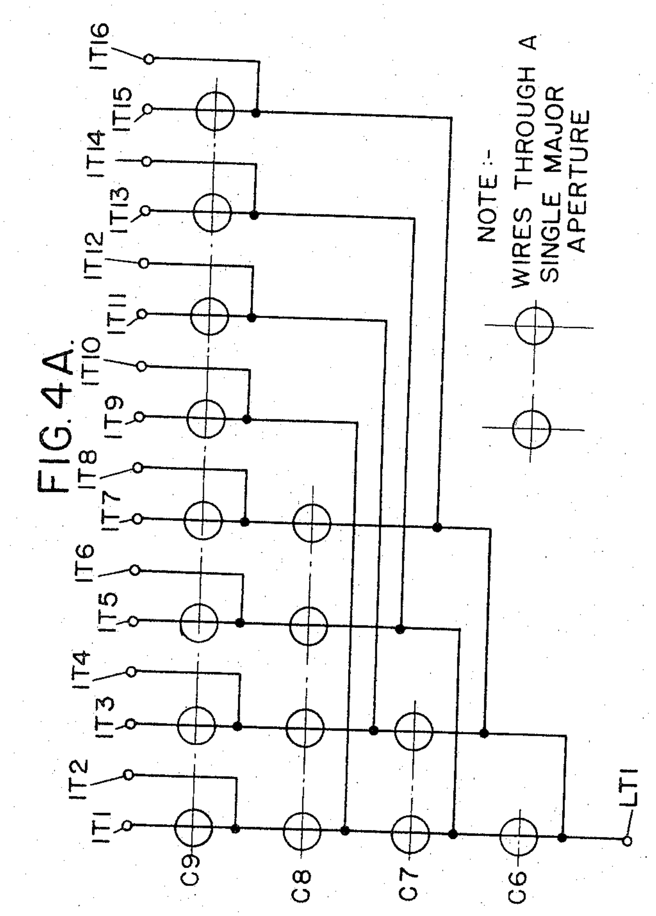
FIGS. 4A and 4B are wiring diagrams which diagrammatically illustrate the connections made through the major apertures of the magnetic cores of FIG. 1.
Figures 4B, 5A:
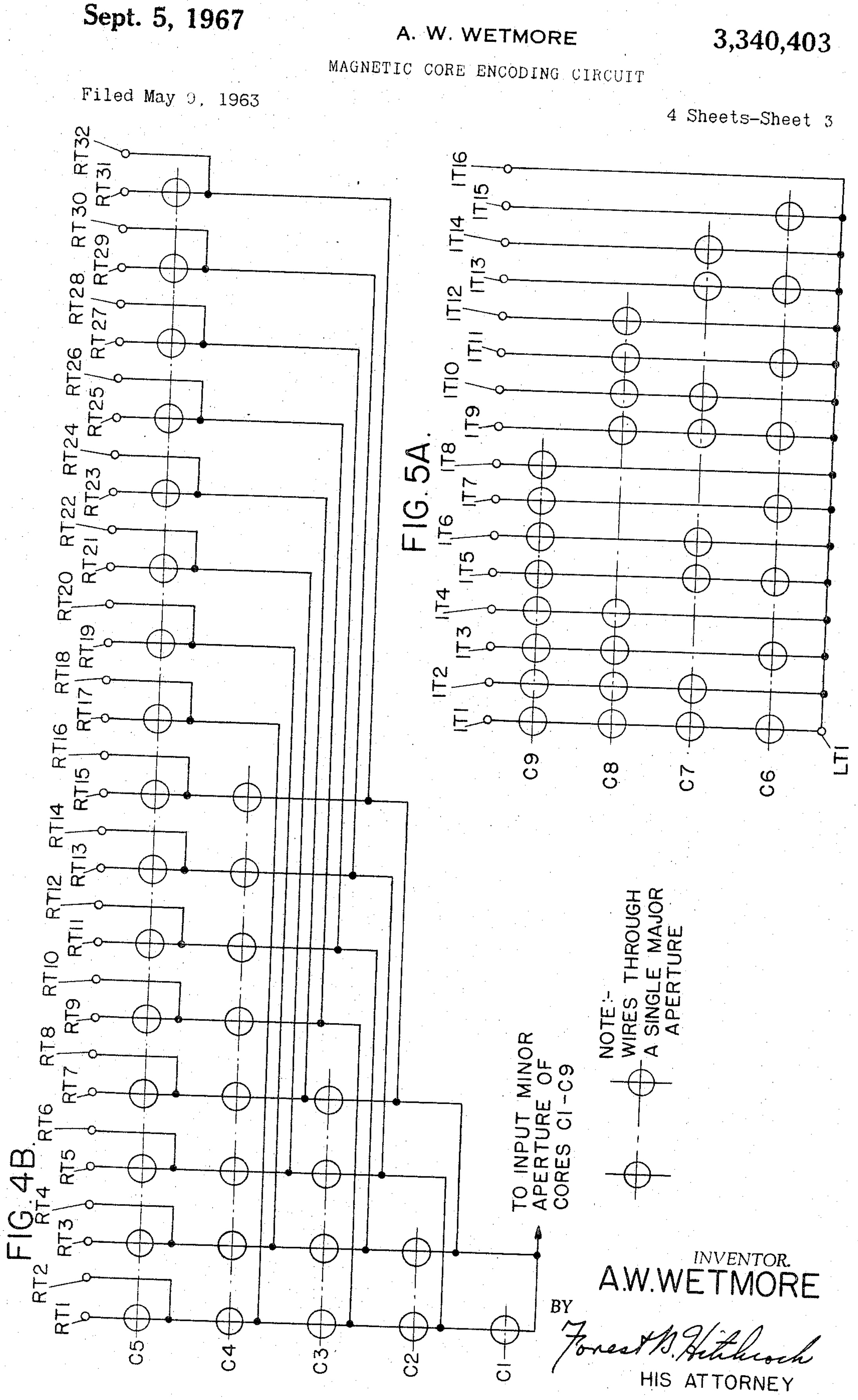
FIGS. 5A and 5B are wiring diagrams which diagrammatically illustrate another means for establishing the connections made through the major apertures of the magnetic cores of FIG. 1.

FIGS. 4A and 4B diagrammatically illustrate the wiring coupled through the major apertures of cores C9–C6 and C5–C1 respectively. The circles in each horizontal row represent the major aperture of the core designated symbolically at the left end of the row. Turning first to FIG. 4A, a group of wires connected to input terminals IT1–IT16 are shown coupled through the major apertures of cores C9–C6 in a coded fashion. These terminals represent one-tenth of the input terminals in plug 34, shown in FIG. 1, receiving input signals from a code selection means. The major aperture of core C9 is represented by 8 circles along a row designated C9, the major aperture of core C8 is indicated by a row of 4 circles designated C8, the major aperture of core C7 is indicated by a row of 2 circles designated C7, and the major aperture of core C6 is indicated by a single circle designated C6. Thus, a wire from input terminal IT1 threads the major apertures of cores C9, C8, C7 and C6, so that a positive voltage applied to input terminal IT1 sets cores C9–C6. Similarly, a wire from input terminal IT2 threads the major apertures of cores C8, C7 and C6, so that a positive voltage applied to input terminal IT2 sets cores C8, C7 and C6, but leaves core C9 in the clear condition. Likewise, a wire from input terminal IT3 threads the major apertures of cores C9, C8 and C7 so that energization of input terminal IT3 with a positive voltage sets cores C9, C8 and C7, but leaves core C6 in the clear condition. In similar fashion, a positive voltage applied to any of input terminals IT4–IT16 sets preselected ones of cores C9–C6 in coded fashion. It should be noted that all wires through cores C9–C6, as shown in FIG. 4A, are terminated at a single terminal LT1, which is shown in FIG. 3 as being mounted on plug coupler 31. If plug 35 of FIG. 1 is utilized in the circuit, the connections to terminal LT1 would of necessity be made through a connector in the plug. For the circuit shown in FIG. 1, there are 9 additional groups of wires coupled through cores C9–C6 in a fashion identical to that shown in FIG. 4A, with the sole exception being that the single output wire of each of the additional groups is coupled to a different one of input terminals LT2–LT10 of plug coupler 31, shown in FIG. 3.

FIG. 4B diagrammatically illustrates the coded wiring through the major aperture of cores C5–C1 in a manner similar to that used for illustrating the wiring through cores C9–C6 in FIG. 4A. In this instance, however, FIG. 4B is a complete diagrammatic showing of all the wires through cores C5–C1. Thus, energization of terminal RT1 sets cores C5–C1, energization of terminal RT2 sets cores C4–C1 and leaves core C5 in the clear condition, energization of terminal RT3 sets cores C5–C2 and leaves core C1 in the clear condition, and so on. Additionally, if plug 36 of FIG. 1 is utilized in the circuit, the connections to terminals RT1–RT32 are of necessity made through connectors in the plug.

The wire bypassing the major aperture of core C1 is returned through input minor apertures 11–19 of cores C1–C9 respectively, to the source of negative direct current. As previously explained, this connection through the input minor apertures serves to prevent oversetting of any core in the event an excessive amount of current is threaded through the major aperture, due to the inherent protection against oversetting which is characteristic of inner leg setting of multiaperture cores.

Figure 5B:
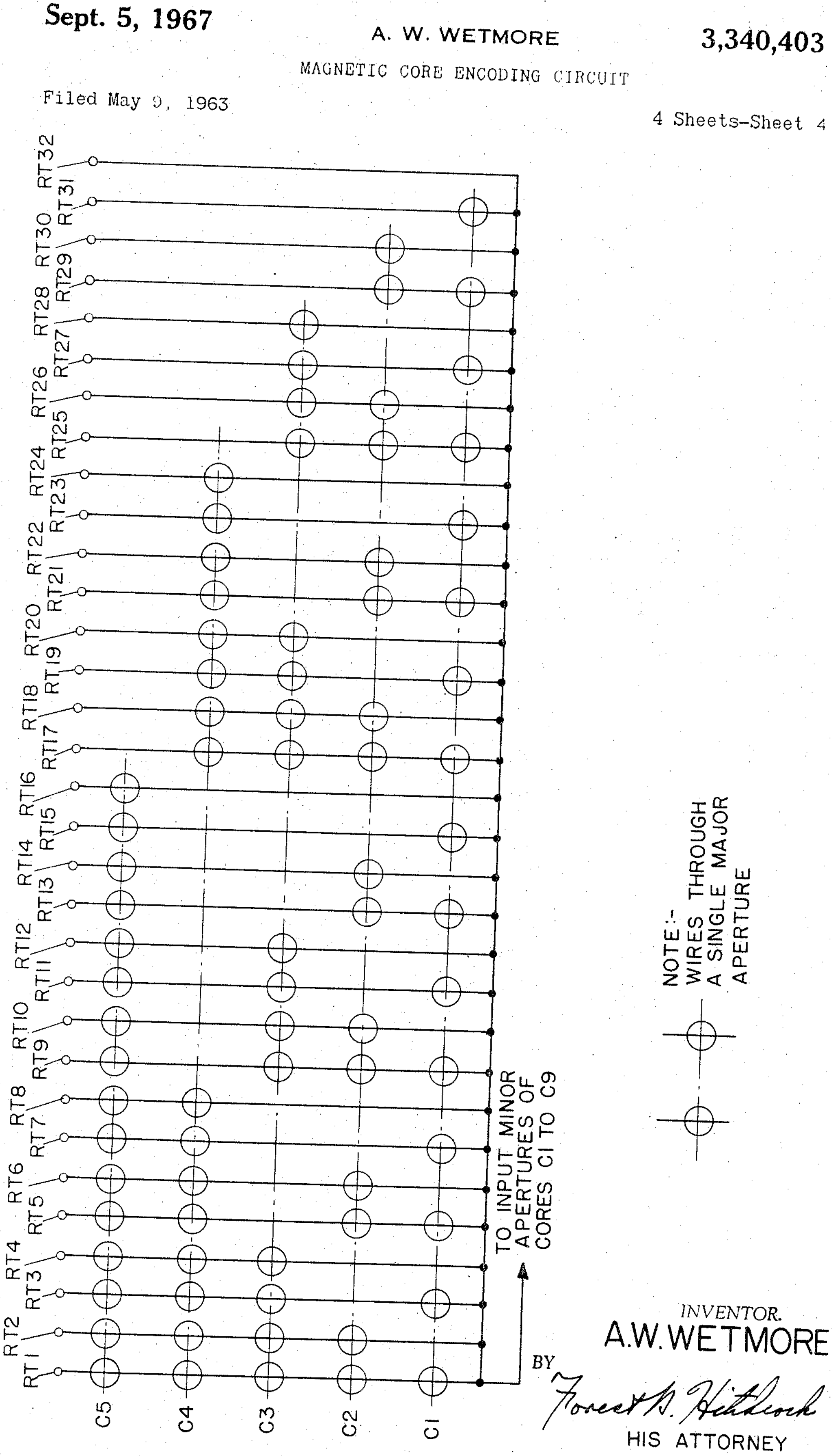

It should be noted that the illustrations of FIGS. 4A and 4B are but one way of diagrammatically illustrating the wiring through the cores. When convenient, each conductor from terminals IT1–IT16 of FIG. 4A may be represented as a separate entity coupled through cores C9–C6 in coded fashion, without any junctions thereon coupling one conductor to any other conductor, as illustrated in FIG. 5A. In this instance, each conductor terminates at terminal LT1. Similarly, each conductor from terminals RT1–RT32 of FIG. 4B may be represented as a separate entity coupled through cores C5–C1 in coded fashion, without any junctions thereon coupling one conductor to any other conductor, as illustrated in FIG. 5B. In this instance, each conductor is separately coupled through input minor apertures 11–19 of cores C1–C9 respectively, to a source of positive direct current. Wiring laid out according to the wiring diagrams is electrically identical to that illustrated in FIGS. 4A and 4B, and is therefore but another mechanical means of achieving identical electrical results.

Thus, there has been shown a method and apparatus for supplying any of a number of output codes from code selection means having less than that number of output conductors. The circuit is highly versatile in that numerous output codes may be produced without coupling an excessively large number of wires through any of the apertured magnetic cores utilized in the circuit. The circuit is particularly applicable to automatic switching systems for railway car classification yards utilizing multiaperture cores as storage means for advancing a code through the classification yard in step with a rolling cut of cars, and throwing track switches just ahead of the cars in accordance with the code supplied to the system. However, the system may be utilized wherever it is desired to utilize a large number of output codes and the apertures in the magnetic cores utilized in the system are insufficiently large to accommodate the number of wires which otherwise would be required for setting the cores. Furthermore, the quantities utilized in the description of this system are for illustrative purposes only; it will be obvious to those skilled in the art that any number of cores and any number of input wires may be combined in a system encompassed by the present invention in order to enable selection of different binary words comprising a large number of binary bits with a smaller number of input wires.

Therefore, although but a single specific embodiment of the present invention has been described, it is to be specifically understood that this form is selected to facilitate in disclosure of the invention rather than to limit the number of forms which it may assume; various modifications and adaptations may be applied to the specific form shown to meet requirements of practice, without in any manner departing from the spirit or scope of the invention.

What is claimed is:

1. Means for establishing a binary code in a group of multiaperture magnetic cores with a minimum of wiring through the cores comprising first and second cores, a group of input conductors, means coupling half of the input conductors through the first core and bypassing the remainder of the input conductors around the first core, a second group of conductors, means coupling half of the second group of conductors through the second core and bypassing the remainder of the second group of conductors around the second core, and switching means selectively coupling said remainder of said first group of input conductors to either half of said second group of input conductors.

2. Means for establishing a binary code in a group of multiaperture magnetic cores comprising first and second cores, third, fourth and fifth cores, a plurality of input conductors, means coupling half of the input conductors through the first core and bypassing the remainder of the input conductors around the first core, means coupling half of the plurality of conductors passed through the first core through the second core and bypassing the remainder of the input conductors around the second core, a second plurality of conductors, means coupling half of the second plurality of conductors through the third core and bypassing the remainder of the second plurality of conductors around the third core, means coupling half of the plurality of conductors passed through the third core through the fourth core and bypassing the remainder of the second plurality of input conductors around said fourth core, means coupling said remainder of the second plurality of conductors through said fifth core, and switching means selectively coupling each of said input conductors to any one of said second plurality of conductors.

3. The apparatus of claim 2 wherein said cores are of the multiaperture type having a major aperture and minor apertures and wherein the coupling of said conductors is by threading said conductors through the major aperture of the cores as specified and the connection of all said conductors to a single conductor threading a minor aperture of each of said cores for effecting the selective setting thereof.

4. The apparatus of claim 3 having an additional conductor couple through the major aperture of each core for clearing the cores, an output means coupled to a minor aperture of each core for providing parallel transfer of output signals from the cores upon simultaneous clearing thereof.

References Cited

UNITED STATES PATENTS

| | | | |
|---|---|---|---|
| 2,884,622 | 4/1959 | Rajchman | 340—174 |
| 3,093,819 | 6/1963 | Lynch | 340—347 |

BERNARD KONICK, *Primary Examiner.*

JAMES W. MOFFITT, *Examiner.*